(12) United States Patent
Lutz

(10) Patent No.: US 6,522,130 B1
(45) Date of Patent: Feb. 18, 2003

(54) ACCURATE ROTOR POSITION SENSOR AND METHOD USING MAGNET AND SENSORS MOUNTED ADJACENT TO THE MAGNET AND MOTOR

(75) Inventor: Jon F. Lutz, Westminster, CO (US)

(73) Assignee: UQM Technologies, Inc., Golden, CO (US)

( * ) Notice: Subject to any disclaimer, the term of this patent is extended or adjusted under 35 U.S.C. 154(b) by 0 days.

(21) Appl. No.: 09/118,980

(22) Filed: Jul. 20, 1998

(51) Int. Cl.$^7$ .................................................. G01B 7/30
(52) U.S. Cl. .............................. 324/207.2; 324/207.25; 310/68 B
(58) Field of Search ........................ 324/207.2, 207.21, 324/207.22, 207.23, 207.24, 207.25, 251, 173, 174; 338/32 H, 32 R; 310/68 B, 68 R, 156.05, 156.06; 318/254

(56) References Cited

U.S. PATENT DOCUMENTS

| | | | |
|---|---|---|---|
| 4,086,519 A | | 4/1978 | Persson ....................... 318/254 |
| 4,482,849 A | | 11/1984 | Doemen et al. ............. 318/254 |
| 4,642,496 A | | 2/1987 | Kerviel et al. ............. 310/68 B |
| 4,785,242 A | | 11/1988 | Vaidya et al. ........... 324/207.25 |
| 4,794,293 A | * | 12/1988 | Fujisaki et al. ............. 310/268 |
| 4,857,784 A | | 8/1989 | Mukaekubo ............... 310/68 B |
| 4,866,382 A | | 9/1989 | Carmen |
| 4,952,830 A | | 8/1990 | Shirakawa ................. 310/68 B |
| 5,036,319 A | | 7/1991 | Shiraki et al. |
| 5,070,264 A | | 12/1991 | Conrad ...................... 310/68 B |
| 5,070,298 A | * | 12/1991 | Honda et al. ............. 324/207.2 |
| 5,095,238 A | | 3/1992 | Suzuki et al. ................ 310/156 |
| 5,148,070 A | * | 9/1992 | Frye et al. ................... 310/168 |
| 5,272,402 A | | 12/1993 | Blaser et al. ............. 310/68 B |
| 5,323,075 A | | 6/1994 | Denk et al. ................ 310/68 B |
| 5,325,005 A | | 6/1994 | Denk ........................ 310/68 B |
| 5,341,097 A | * | 8/1994 | Wu ........................ 324/207.21 |
| 5,367,257 A | * | 11/1994 | Garshelis ................. 324/207.2 |
| 5,444,369 A | * | 8/1995 | Luetzow ................... 324/207.2 |
| 5,541,777 A | * | 7/1996 | Sakamoto et al. .......... 359/824 |
| 5,545,985 A | | 8/1996 | Campbell |
| 5,633,546 A | | 5/1997 | Horst ........................ 310/68 B |
| 5,677,605 A | | 10/1997 | Cambier et al. ............. 318/254 |
| 5,686,770 A | | 11/1997 | Naito ........................ 310/68 B |
| 5,701,552 A | * | 12/1997 | Stephany et al. ............. 399/53 |
| 5,757,180 A | * | 5/1998 | Chou et al. ............... 324/207.2 |
| 5,861,745 A | * | 1/1999 | Herden ..................... 324/207.2 |

FOREIGN PATENT DOCUMENTS

| | | |
|---|---|---|
| DE | 43 33 079 | * 3/1995 |
| DE | 44 20 214 A1 | 12/1995 |
| DE | 44 40 214 | * 5/1998 |
| JP | 54-66410 | * 5/1979 |
| JP | 56-2566 A | 1/1981 |
| WO | 89/11523 | 11/1989 |

OTHER PUBLICATIONS

US 5,712,545, 1/1998, Rappenecker (withdrawn)
Peter Campbell, "Miniature Magnetic Encoder" Machine Design, Mar. 8, 1990, pp. 105–108.

* cited by examiner

Primary Examiner—Jay Patidar
(74) Attorney, Agent, or Firm—Burns, Doane, Swecker & Mathis, L.L.P.

(57) ABSTRACT

An inexpensive and accurate device for sensing rotor position and detecting rotational speed over a broad range of speeds in an electric motor includes a sense ring magnet and two analog Hall effect sensors. The sense ring is magnetized in an alternating north-south fashion with a number of poles that correspond to a number of motor field poles. The Hall effect sensors are placed so that they measure magnetic flux tangential to the sense ring. The Hall effect sensors are preferably located at a distance from the sense ring where the Hall effect sensor output waveforms are substantially triangular, with a highly linear portion centered at zero flux between the minimum and maximum waveform peaks. The linear portions of the waveforms are decoded using an A/D converter and control software to provide an accurate measure of the rotor position.

12 Claims, 8 Drawing Sheets

Magnetic Flux Lines on a Ring (3 poles shown)

Magnetic Flux Lines on a Disk (3 poles shown)

Magnetic Flux Lines on a Ring (3 poles shown)

FLUX AT AIR GAP NORMAL TO DISK OR RING

FLUX AT AIR GAP TANGENTIAL TO DISK OR RING

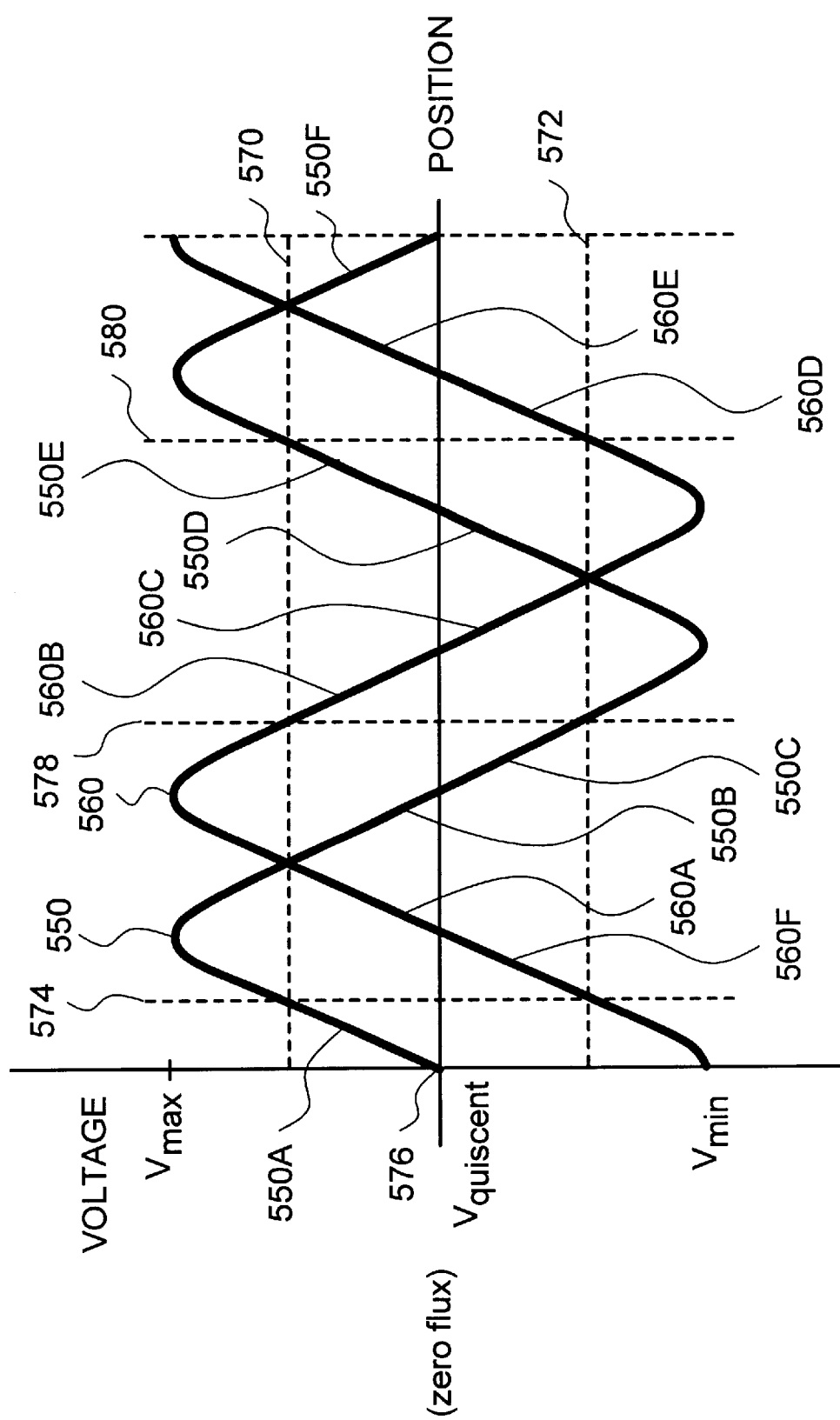

Flux at Large Air-Gap Tangential
to Disk or Ring

ACCURATE ROTOR POSITION SENSOR AND METHOD USING MAGNET AND SENSORS MOUNTED ADJACENT TO THE MAGNET AND MOTOR

BACKGROUND OF THE INVENTION

1. Field of the Invention

The invention relates generally to the field of electric motors, and in particular to a sensor and method for accurately sensing a position of a rotor in a brushless electric motor using a magnetic sense element and linear output Hall effect sensors.

2. Description of Related Art

Electric motors that require controlled armature current waveforms (in order to rotate smoothly, for example) also require accurate rotor position sensing. Some motors use sensorless technologies, but these technologies do not provide accurate rotor position sensing at very low speeds and are not smooth upon startup of the motor. Other motors inherently cannot use sensorless technologies and must incorporate a rotor position sensing mechanism. Currently, state of the art motors use either an encoder or a resolver together with associated electronic circuitry to determine rotor positions. Depending on the resolution required, however, these solutions can become prohibitively expensive within applications that require low cost motors.

In particular, many electric motor applications require smooth rotation and/or accurate control. Brushless motors typically achieve this by using 3-phase sine-wave commutation and accurate rotor position detectors, usually in the form of an encoder or a resolver. The accurate rotor position detector ensures that the sine wave remains synchronized with the rotor, thus avoiding commutation-induced torque ripple. Methods presently used in the industry for accurately detecting rotor positions use encoders and resolvers and have been known and employed in motor drives for many years.

Encoders sense mechanical motion, and translate the sensed motion into electrical signals. Optical encoders are the most common type of encoder. An optical encoder typically includes a housing to support precision bearings and electronics, a shaft with a disc that is called an "optical disc" and has alternating clear and opaque segments, a light emitting diode (LED), and a photo transistor receiver. A beam of light produced by the LED is aimed at the optical disc. When the optical disc rotates, the light beam passes through the clear segments but is blocked by the opaque segments so that the optical disc effectively pulses the light beam. The pulsed light beam is received by the photo transistor receiver. The photo transistor receiver and the circuitry inside the encoder together provide signal to a motor controller outside the encoder and can also perform functions such as improving noise immunity. Encoders in their simplest form have one output to determine shaft rotational speed or to measure a number of shaft revolutions. Other encoders have two outputs and can provide direction-of-rotation information as well as speed and number of revolutions. Still other encoders provide an index pulse, once per revolution, which indicates an absolute rotor position. The description thus far relates specifically to incremental encoders, where upon startup, the position of the encoder is not known. A second type of encoder, called an absolute encoder, has a unique value for each mechanical position throughout a rotation. This unit typically consists of the incremental encoder described above with the addition of another signal channel that serves to generate absolute position information, typically of lesser accuracy. Within an absolute encoder that is provided with an index pulse, the accuracy improves once the rotor traverses the index pulse. Incremental encoders can be acceptable within asynchronous motors, where speed feedback is most important. Absolute encoders are desirable within synchronous motor applications, where both position and speed feedback are important.

Another class of high resolution encoders is produced by several companies, and is referred to as "sine/cosine encoders". Sine/cosine encoders generate sine and cosine signals rather than pulse waveforms. When used with additional electronics, processor capability and software, sine/cosine encoders indicate rotor position with fine resolution.

Encoders of all types are precision built, sensitive devices that must be mechanically, electrically and optically matched and calibrated.

Resolvers, on the other hand, typically provide one signal period per revolution and are known to be highly tolerant of vibration and high temperatures. A typical use of this technology would include a resolver generating two signals, both a sine-wave signal and a cosine-wave signal, for each revolution. An advantage of using resolvers is that they provide absolute rotor position information, rather than incremental information as is typical with most encoders. A primary drawback, however, is that resolvers deliver increasingly poor performance at low speeds. Because of this limitation, the speed control range possible with resolvers is much smaller than with encoders, on the order of 200:1 Accordingly, use of resolvers is typically limited to applications that do not require high quality motor control over a wide speed range. As with encoders, resolvers are precision built, commercially available sensing devices that can be fragile and expensive.

Ring magnets and digital Hall effect sensors are often used as a rotor position sensing mechanism within brushless direct current (DC) motor applications where square-wave or six-step drive is used. This method of sensing provides low resolution, typically six position steps per electrical cycle when using three sensors. Six-step drive does not require high resolution rotor position sensing, however, so this is acceptable. At the same time, these drive methods do not result in ripple-free torque from the motor either. This may be unacceptable in a variety of applications.

OBJECTS AND SUMMARY

Accordingly, a need exists for an accurate, low-cost device that senses rotor position and detects rotational speed. According to an embodiment of the invention, this need is satisfied by providing an assembly that includes a magnetic sense element such as an inexpensive sense ring magnet and two analog Hall effect sensors. In this embodiment the sense element is fixed with respect to the motor rotor, and the sensors are fixed with respect to the motor stator.

The sense ring is magnetized in an alternating north-south fashion with a number of poles that corresponds to a number of motor field poles. The Hall effect sensors are placed so that they measure the magnetic flux tangential to, and at some distance from, an outer circumference of the ring.

Orienting the Hall effect sensors to measure magnetic flux tangential to an outer circumference of the ring and at some distance from the ring results in a Hall effect sensor output voltage waveform that is substantially triangular, with a highly linear portion centered at zero flux, between the minimum and maximum peaks. This linear portion can be decoded, e.g., using an analog-to-digital (A/D) converter and control software, into an accurate measure of rotor position. The cycle or output waveform repeats itself for every pole pair. For example, where there are two evenly spaced pole pairs, the output waveform of a Hall effect sensor will repeat twice for each mechanical revolution, i.e., will have two complete electrical cycles. Accordingly, the inventive method can be used to decode rotor position within or relative to a complete electrical cycle, but not necessarily within a complete mechanical rotation that includes more than one electrical cycle, unless an absolute position reference such as an index pulse is also provided.

The relationship between electrical and mechanical degrees is given as °E=°M·PP, where °E represents electrical degrees, °M represents mechanical degrees, and PP represents the number of magnetic pole pairs of the motor. By detecting absolute rotor position within a complete electrical cycle, current can be controlled accurately at all times to result in smooth rotation of the rotor.

According to another embodiment of the invention, the two Hall effect sensors can be placed further away from the sense ring, so that each Hall effect sensor outputs a substantially sinusoidal waveform. When the two Hall effect sensors are placed 90 electrical degrees apart, one output becomes a sine wave and the other becomes a cosine wave.

Additional features and advantages of the invention will become apparent from the following description of the preferred embodiments, taken in conjunction with the accompanying drawings. The accompanying drawings illustrate, by way of example, the principles of the invention.

BRIEF DESCRIPTION OF THE DRAWINGS

FIGS. 5A and 5B show outputs of two Hall effect sensors located near a sense disc or sense ring in a preferred embodiment of the invention, and a range over which the outputs are used to decode rotor position.

DETAILED DESCRIPTION OF THE PREFERRED EMBODIMENTS

Figure 1:
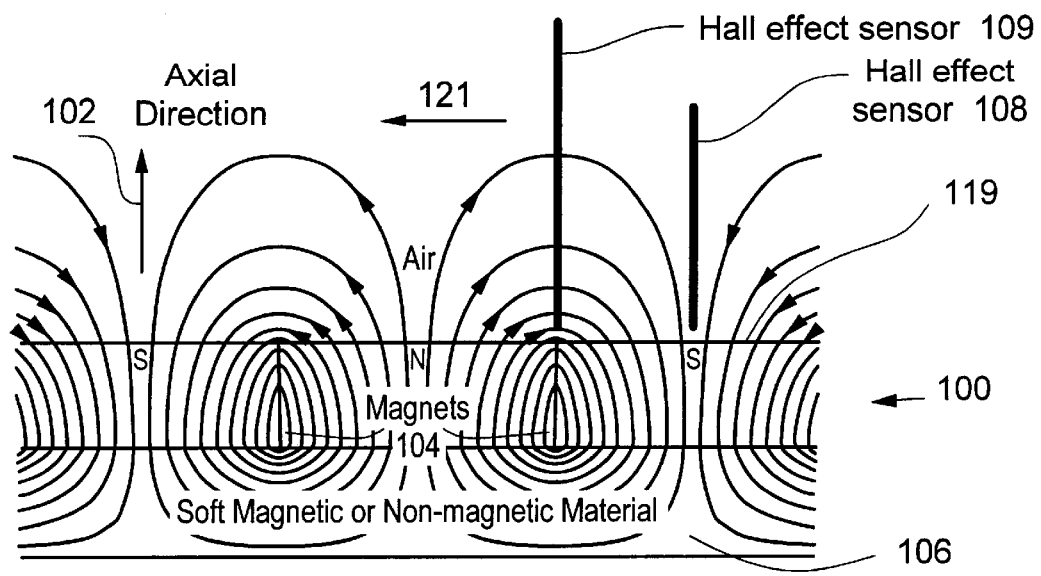
FIG. 1 is a side view along a radial direction, of magnetic fields generated by a multi-pole sense disc magnet that is magnetized in an axial direction.
Figure 2:
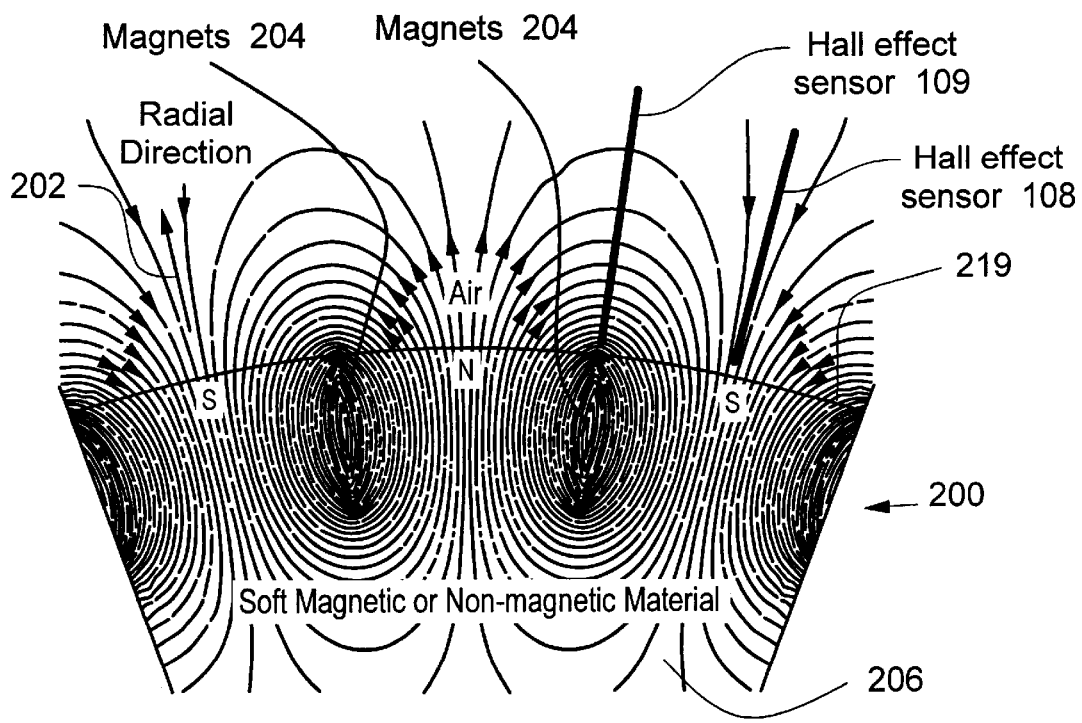
FIG. 2 is an end view along an axial direction of magnetic fields generated by a multi-pole sense ring magnet that is magnetized in a radial direction.
Figure 5B:
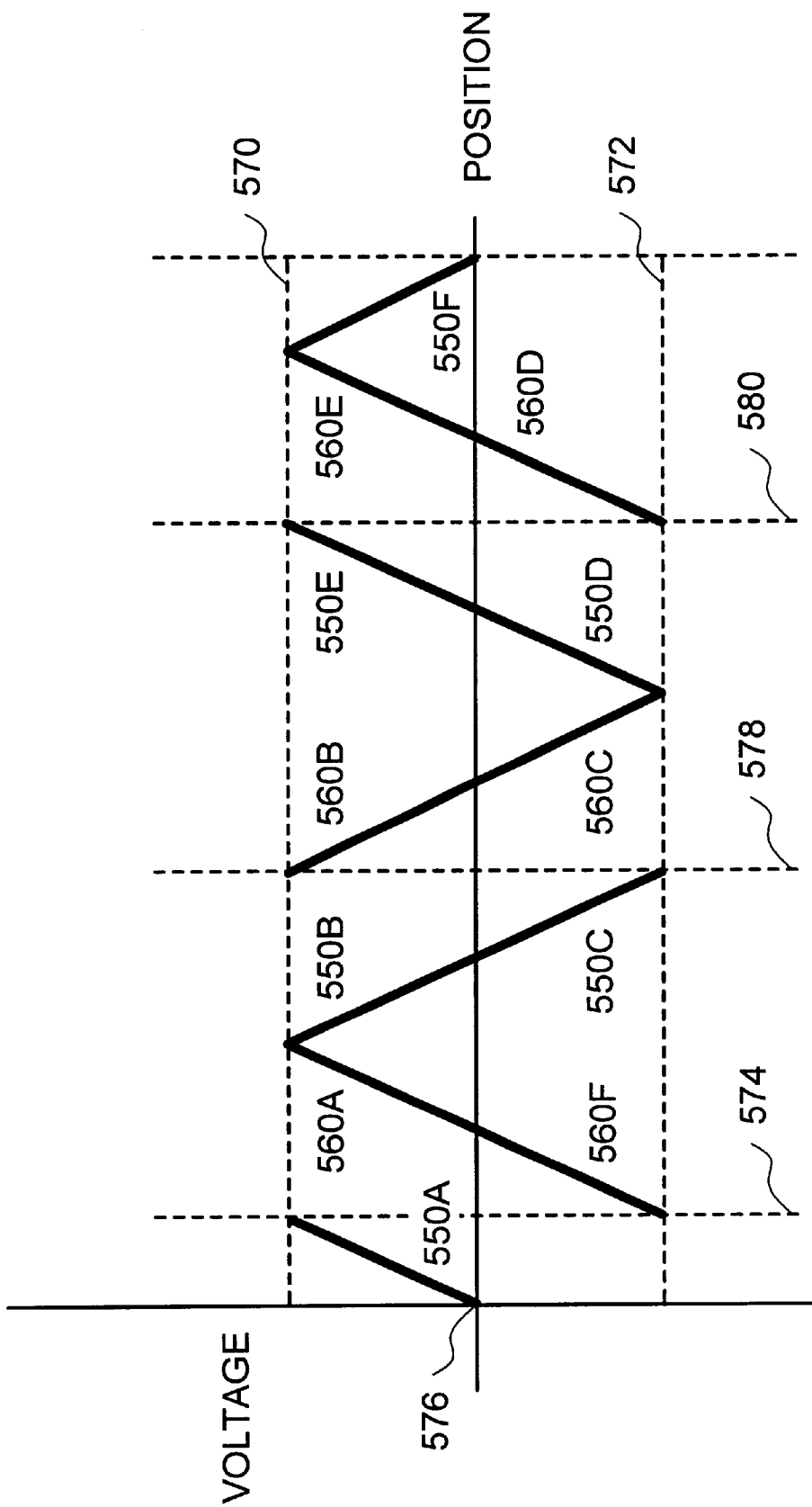
Figure 6:
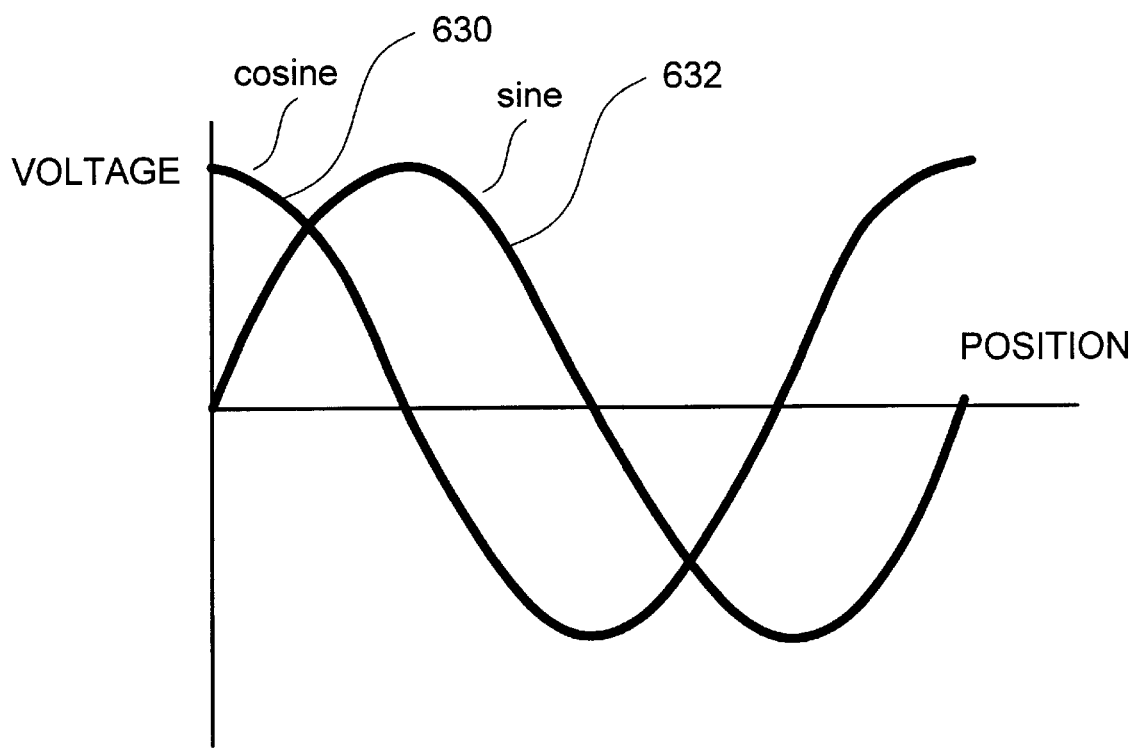
FIG. 6 is a graph of a magnetic field tangential to a face of the disc magnet of FIG. 1 or of the ring magnet of FIG. 2, at a distance greater than that shown in FIG. 4.
Figure 7:
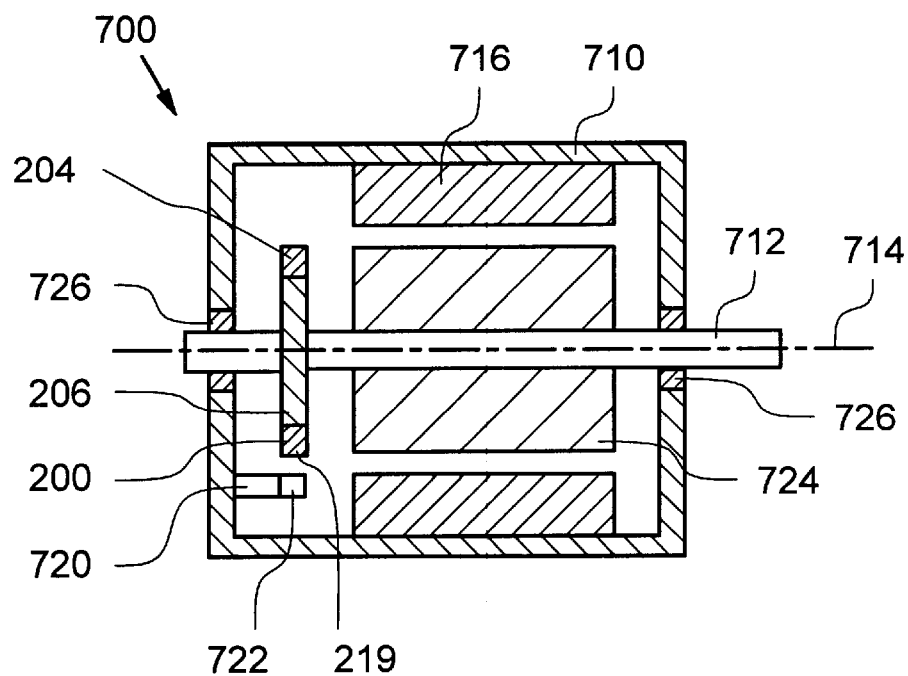
FIG. 7 is a side view of an electric motor with a sense ring in accordance with an embodiment of the invention.
Figure 8:
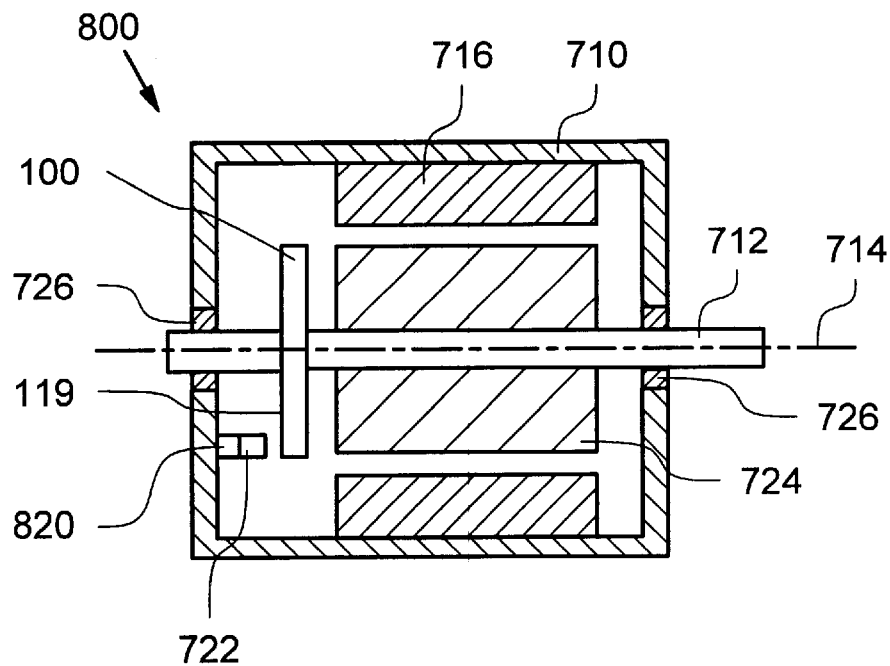
FIG. 8 is a side view of an electric motor with a sense disc in accordance with an embodiment of the invention.

In accordance with the invention, the magnetic sense element can be configured in a variety of shapes. For example, the magnetic sense element can be a magnetized ring, i.e., sense ring, or a magnetized disc, i.e., sense disc, and can be axially magnetized or radially magnetized. In a first preferred embodiment of the invention, the ring or disc is magnetized with a number of magnetic poles that matches a number of field poles of the motor. Setting the number of magnetic poles equal to the number of motor field poles generally simplifies the process of decoding Hall effect sensor output(s) to indicate rotor position. The magnetic poles of the ring or disc alternate in polarity as shown in FIGS. 1 & 2. In particular, FIG. 1 shows a side view of an axially magnetized disc 100, while FIG. 2 shows a radially magnetized ring 200. The waveforms shown in FIGS. 3–6 represent relationships between rotor position and measured magnetic flux, with rotor position along the horizontal axis and measured magnetic flux along the vertical axis. FIGS. 7 and 8 show electric motors with a sense ring and a sense disc, respectively, in accordance with embodiments of the invention.

FIG. 7 shows a motor 700 that has a stator 716, a rotor 724, and a shaft 712 located inside a housing 710. The housing 710 supports the shaft 712 via bearings 726. A sense ring 200 like that shown in FIG. 2 is affixed to the shaft 712 and rotates with the shaft 712 and rotor 724 about an axis 714. A Hall effect sensor 722 is positioned near the sense ring 200 by a support 720, so that the sensor 722 measures magnetic flux from the sense ring 200 that is tangential to an outer circumference 219 of the sense ring 200. See, e.g., FIG. 2, wherein the Hall effect sensors 108, 109 are oriented to measure magnetic flux that is parallel or tangential to the outer circumference 219, i.e., perpendicular to a radial direction 202. The sensor 722 is fixed with respect to the stator 716.

The sense ring 200 includes magnets 204 arranged so that the ring 200 is magnetized in directions radial from a rotational axis, e.g., in the radial direction 202. The ring 200 is provided with an inner ring or backing material 206. The material 206 can be a softly magnetic material, for example a ferrous material like carbon steel, or can be a non-magnetic material, for example nylon.

FIG. 8 shows a motor 800 that is similar to that shown in FIG. 7, but has a sense disc 100 like that shown in FIG. 1. A support 820 positions the Hall effect sensor 722 so that the sensor 722 measures magnetic flux from the sense disc 100 that is perpendicular to the rotational axis 714 and parallel with a face 119 of the sense disc 100. See, e.g., FIG. 1, wherein the Hall effect sensors 108, 109 are oriented to measure magnetic flux that is parallel to a face 119 of the sense disc 100, i.e., perpendicular to an axial direction 102 about which the disc 100 rotates. As in FIG. 7, the sensor 722 as shown in FIG. 8 is fixed with respect to the stator 716.

The disc 100 includes magnets 104 arranged so that the disc 100 is magnetized in the axial direction 102. The disc 100 is also provided with a backing material 106 that is softly magnetic, such as a ferrous material like carbon steel, or is non-magnetic.

Each magnetic pole of the sense ring or disc should be magnetized uniformly in either the radial or axial direction so that no magnetization "wave shaping" is necessary. The magnets can be made of an inexpensive material such as ferrite or bonded NdFeB.

The Hall effect sensors should be of the analog linear type, with a signal output that is linear over some range of magnetic flux (∓|B|). For example, commercial analog linear Hall effect sensors that are suitable and currently available typically have linear magnetic flux ranges between about ∓500 gauss and about ∓1,500 gauss.

The sensors 108, 109 are aligned or oriented so that they measure the magnetic fields perpendicular to the magnetization directions 102, 202. In other words, the sensors are aligned to measure magnetic flux tangential to the surface of the sense ring or disc.

As those of ordinary skill in the art will appreciate, a Hall Effect occurs when, in the context of a three-dimensional coordinate system with three orthogonal axes x, y and z, an element carrying an electric current in the x-axis direction is placed in a magnetic field whose flux, or lines of force, are aligned parallel with the z-axis. Because charged particles passing through a magnetic field experience a Lorentz force, the electrons traveling in the x-axis direction will be deflected by a Lorentz force in the y-axis direction. This creates a charge imbalance across the current-carrying element in the y-axis direction, and a corresponding voltage across the current-carrying element in the y-axis direction.

A typical Hall effect sensor has a planar element oriented in the x-y plane, with a current flowing through the element in the x-axis direction. When magnetic flux along the z-axis passes through the planar element, a voltage will appear across the element in the y-axis direction that is proportional to the magnetic flux passing through the planar element. This voltage is the Hall effect sensor output.

In a situation where the Hall effect sensors 108, 109 are provided with a planar conducting element, the view in FIGS. 1 and 2 of the Hall effect sensors 108, 109 is along an edge of the planar conducting element of each sensor. In other words, the plane of the element can be defined by a rotational axis of the disc 100 or the ring 200 and a radial direction of the disc 100 or ring 200 that intersects and is perpendicular to the rotational axis. When the sensor 108 is located at a pole, as shown in FIGS. 1 and 2, no magnetic flux passes through the sensor 108 and the voltage across its planar element in the direction perpendicular to the current flow direction will be zero. As can be seen from FIGS. 1 and 2 with reference to the sensors 109, magnetic flux passing through the sensor 109 is at a maximum when the sensor 109 is located equidistant between two adjacent magnetic poles, and a magnitude of the voltage across its planar element in the direction perpendicular to the current flow direction will be at a maximum.

Figure 10:
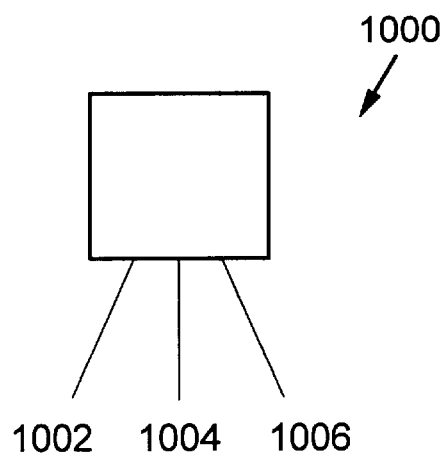
FIG. 10 is a front view of a conventional 3-wire Hall effect sensor.

FIG. 10 shows a front view of a conventional Hall effect sensor 1000 with three electrical leads 1002, 1004 and 1006. Typically, one of the leads is connected to ground, another is connected to a source voltage, and the third provides a sensor output voltage that indicates a magnitude and a direction or polarity of magnetic flux passing the through the planar face of the sensor 1000. Conventional 3-lead Hall effect sensors such as the sensor 1000 are typically configured so that the sensor output voltage on the third lead ranges from 0 volts to the source voltage, where 0 volts represents a maximum magnetic flux with a first polarity, and the source voltage represents a maximum magnetic flux with the opposite polarity, and an output of half the source voltage is a quiescent output representing zero magnetic flux passing through the sensor. The Hall effect sensors 108, 109 can be of this type, or can be of any other suitable type of Hall effect sensor.

Figure 4:
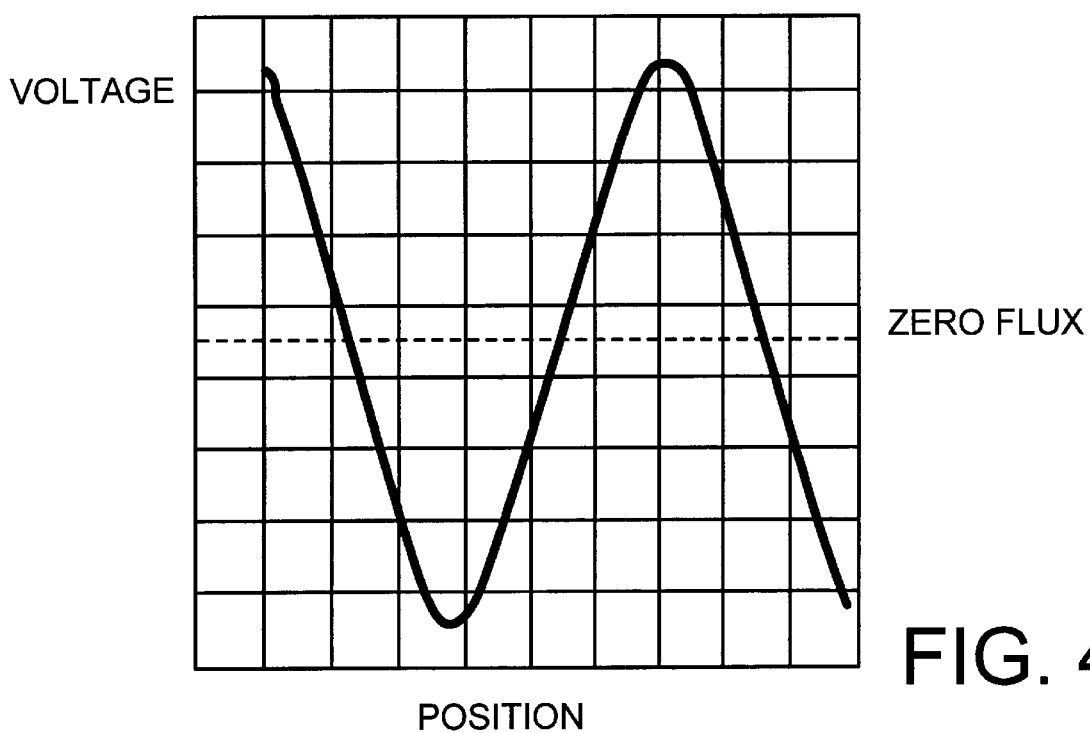
FIG. 4 is a graph of a magnetic field parallel to an axial face of the disc magnet of FIG. 1 or tangential to a radial face of the ring magnet of FIG. 2, that is measured at an air gap distance away from the disc or ring.

The Hall effect sensors 108, 109 can be located at a specified air gap distance from the surface of the sense ring or disc so that a waveform output of each of the sensors 108, 109 will be quasi-triangular as shown in FIG. 4. The waveform output shown in FIG. 4 is a graph of sensor output voltage along the vertical axis, and position of the sensor relative to the disc 100 or ring 200 along the horizontal axis. The air gap distance can be, for example, on the order of 100 mils (about 2.5 millimeters) or less. An air gap distance at which the Hall effect sensor output will be quasi-triangular can vary depending on the particular characteristics of the sense ring and Hall effect sensor used, and can be easily determined by experiment given specific device components and usage conditions. At a further distance, the waveform output becomes sinusoidal as shown in FIG. 6.

Figure 3:
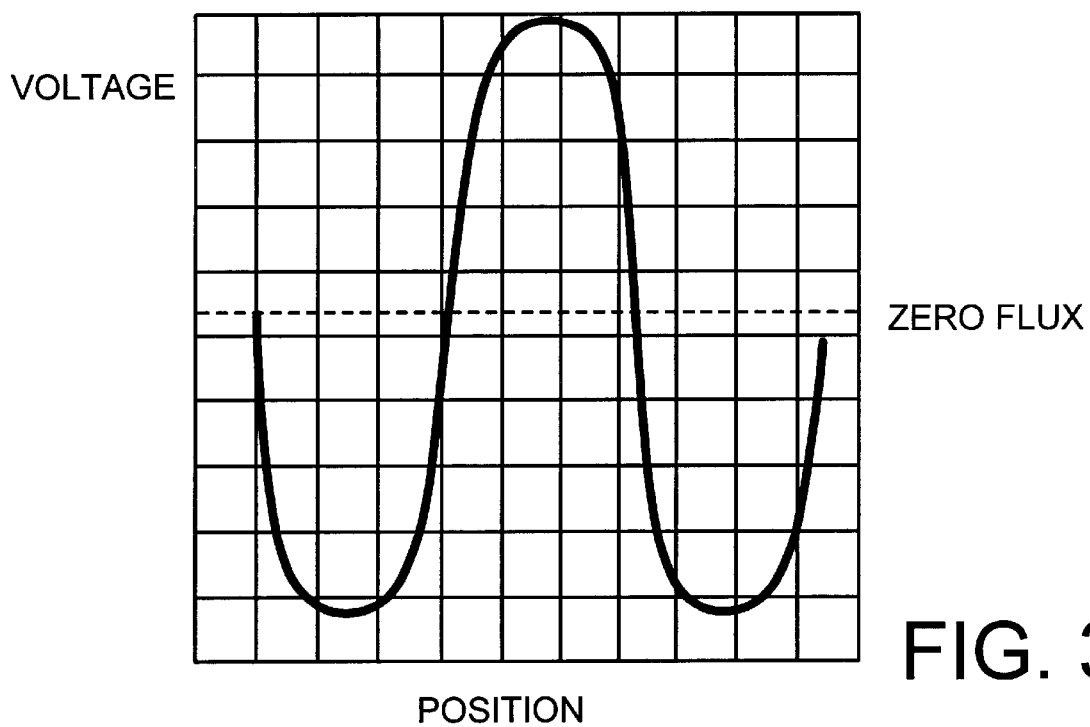
FIG. 3 is a graph of a magnetic field nearby and normal to an axial face of the disc magnet of FIG. 1 or a radial face of the ring magnet of FIG. 2.

In contrast, traditional Hall effect sensor arrangements align the Hall effect sensors to measure magnetic flux in the direction of magnetization, normal to the sense ring, and output flux waveforms similar to that shown in FIG. 3. For example, with respect to FIGS. 1 and 2, a traditionally arranged Hall effect sensor would have its planar conducting element parallel to the surface 119 or tangential to the surface 219, and would have a maximum output at a magnetic pole and a minimum output at a location equidistant between two adjacent magnetic poles.

As shown in FIG. 3, the waveform generated using traditional Hall effect sensor arrangements is linear, i.e., has a constant slope, for only a small portion of the waveform period near the zero flux crossings. In the remainder of the waveform period, the waveform shape curves and is then relatively flat (i.e., has a slope with a small value) for a large portion of the waveform period near the waveform extremes. This waveform shape is will not produce accurate rotor position detection for several reasons.

First, the waveform shape shown in FIG. 3 is undesirable because it is linear for only a small portion of the waveform period. In contrast, an ideal waveform shape would have linear slope for at least one half of the waveform period. A linear shape is desirable because converting or decoding a voltage level into a rotor position can be done simply and consistently when the voltage level changes linearly with rotor position.

Second, the waveform shown in FIG. 3 is relatively flat for a large portion of the waveform period, near the waveform extremes; this is undesirable because the ratio of voltage change to rotor position change becomes smaller as the waveform slope flattens. This small ratio requires greater measurement sensitivity and increases the system's vulnerability to noise.

Third, for the portions of waveform period where the waveform shape is curved, the shape of the curve must be known and additional computation must be performed using the shape of the curve to accurately determine the rotor position.

FIG. 4 shows a Hall effect sensor output waveform that is much more desirable than the waveform shown in FIG. 3. As shown in FIG. 4, the waveform shape surrounding the zero flux crossing is linear, while the waveform shape at the peaks is slightly rounded. As shown in FIG. 4, well over half of the waveform shape is linear. A preferred embodiment of the invention avoids using the rounded waveform shape at the peaks to determine rotor position by using two linear Hall effect sensors spaced 90° electrical apart. Rotor position information is supplied by both sensors in an alternating fashion, as shown for example in FIGS. 5A and 5B, so that only linear portions of the sensor output waveforms are used.

Since the sensor output waveforms are non-linear only near their peaks, non-linear portions of the waveforms can be identified by comparing a sensor's output to a threshold value which is less than or equal to a magnitude below which the waveform is linear, and above which the waveform is non-linear.

As can be seen in FIGS. 4 and 5A, the waveform of each sensor is generally linear within about 60° on either side of a zero crossing of that waveform. Since the two sensors (and therefore their respective zero crossings) are spaced 90 electrical degrees apart, as for example the Hall effect sensors 108, 109 shown in FIGS. 1 & 2, this means that both sensors 108, 109 will simultaneously have a linear output in a region midway between two adjacent zero crossings, where one of the adjacent zero crossings is a zero crossing for the sensor 108 and the other adjacent zero crossing is a zero crossing for the sensor 109, e.g., two adjacent zero crossings of the waveforms 550 and 560 of FIG. 5A. Since the distance between the sensors 108, 109 (and thus the waveforms 550 and 560) is 90 electrical degrees, and since each of the waveforms 550, 560 is substantially linear within 60 electrical degrees on either side of its zero crossing, the width of each overlap region where both waveforms 550, 560 are simultaneously linear is 30 electrical degrees. Thus, at any position at least one of the sensors 108, 109 will have a linear output of voltage with respect to a position of the sense element relative to the sensor, and at some positions (between 30 and 60 electrical degrees distant from each waveform zero) both sensors 108, 109 will have a linear output.

If sensors are used wherein each sensor's output waveform has a linear region covering less than 60 electrical degrees on either side of a zero crossing for that sensor, then the overlap region where both sensors have a linear output will be correspondingly smaller. Where each of the two sensor waveforms is linear within 45° of a zero crossing of that waveform, but is non-linear further than 45° from the zero crossing (until it is within 45° of the next zero crossing for that waveform), then since the two sensors 108, 109 are spaced 90 electrical degrees apart the linear regions of the two waveforms will not overlap although at any location one of the waveforms will be linear.

A simple solution is to choose the threshold value to equal a waveform value that occurs at plus or minus 45 electrical degrees from a zero crossing of the waveform. With this threshold value, as shown in FIGS. 5A and 5B, at any point in time one and only one of the two sensors 108, 109 will have an output that is below the threshold value. Thus, a motor controller can use this threshold value to easily determine which sensor to heed for rotor position information.

In particular, as shown in FIG. 5A one of the two sensors 108, 109 outputs the waveform 550, and the other sensor outputs the waveform 560. The vertical axis represents voltage, and the horizontal axis represents position, for example, positions of each sensor with respect to the sense element. A reference line 574 is located 45 electrical degrees from an origin 576, which is also a "zero point crossing" for the waveform 550. The waveforms 550, 560 are linear between the thresholds 570 and 572. Linear segments of the waveforms 550, 560 that are located between the thresholds are labeled 550A–F and 560A–F. Reference lines 578 and 580 are located 45 electrical degrees from zero point crossings of the waveforms 550 and 560. As can be seen in FIG. 5A, each position along the horizontal axis corresponds to a point on only one of segments 550-A–F and 560A–F. FIG. 5B is similar to FIG. 5A, but omits portions of the waveforms 550 and 560 that fall outside the thresholds 570 and 572 so that the linear portions of the waveforms that are used by the motor controller, i.e., the segments 550A–F and 560A–F, can be more easily seen.

Each of the Hall effect sensors 108, 109 will output the quiescent value $V_{quiescent}$ when there is no magnetic flux passing through the Hall effect sensor. For example, the Hall effect sensor 108 has no magnetic flux passing through it, and thus will output the quiescent value. When one of the Hall effect sensors 108, 109 has a maximum amount of magnetic flux passing through it, as for example the Hall effect sensor 109 shown in FIG. 1, it will output one of the minimum value $V_{min}$ or the maximum value of $V_{max}$. Whether it outputs the maximum or the minimum value depends on the direction in which the magnetic flux passes through the Hall effect sensor 109. Since the magnets 104 alternate polarity and thus magnetic flux direction, outputs of the Hall effect sensors 108, 109 will also alternate between the minimum and maximum values as, for example, the Hall effect sensors 108, 109 move through the magnetic fields in the direction 121 shown in FIG. 1.

When the Hall effect sensors 108, 109 are of the conventional 3-lead type described above with respect to FIG. 10, the maximum value $V_{max}$ of the output waveforms 550, 560 is an input voltage $V_{in}$ provided to the corresponding Hall effect sensors, the quiescent value $V_{quiescent}$ or "zero" of the output waveforms 550, 560 is half the input voltage or $V_{in}/2$, and the minimum value $V_{min}$ is zero volts.

An absolute rotor position within an electrical cycle can be determined using the two sensors. As shown for example in FIG. 5A with respect to the waveforms 550, 560, for each waveform, all values of the waveform (except for the minimum and maximum values) occur twice in an electrical cycle. For example, for a given value of the waveform 550 that is between the quiescent voltage $V_{quiescent}$ and the threshold 570, the position can lie on either the segment 550A or on the segment 550B. When a value of the waveforms 550, 560 that is between the thresholds 570, 572 is being used to indicate rotor position, the value of the other one of the waveforms 550, 560 can be used to determine which one of the two segments of the first waveform should be used. For example, where a value of the waveform 560 lies above the quiescent voltage but below the threshold 570, and the corresponding value of the waveform 550 is greater than the quiescent voltage, the rotor position corresponds to the linear segment 560A rather than the linear segment 560B. Thus, the waveforms 550, 560 together indicate an absolute position of the rotor within an electrical cycle.

In the embodiment described above two sensors are located 90 electrical degrees apart, and the thresholds 570, 572 are chosen so that each location along the horizontal axis corresponds to one point on a linear waveform segment.

However, other configurations can be used. For example, a distance between sensors can be adjusted to an appropriate value that is different from 90 electrical degrees, more than two sensors can be used, and thresholds can be set differently. Reasons for using a different configuration can include, for example, using sensor output waveforms that have different linear regions. The linear regions can vary depending on characteristics of the sensors, air gap distances between the sensors and the sense element, and other factors. Configurations having a) points on linear waveform segments for only some sensor-sense element positions, b) multiple points on linear waveform segments for only some sensor-sense element positions, or c) multiple points for each position, can also be variously useful or desirable depending on particular applications of the invention.

The preferred embodiment uses a microprocessor based controller to take the analog signals provided by the linear Hall effect sensors and convert them to digital signals using an A/D converter. This configuration can provide high resolution rotor position sensing. For example, assume that a motor contains eight pole pairs and that each diagonal line in FIG. 5 equates to 256 rotor position steps. Since there are eight electrical cycles per rotation and four lines per electrical cycle, the total resolution per rotation equals 8192 (256×8×4). This is excellent resolution within a motor-driven system. Another significant advantage is that this system can be incorporated into a motor for little cost.

In another embodiment of the invention, the air gap between the sense ring and the sensor is increased so that the sensor output describes a substantially sinusoidal waveform, as shown in FIG. 6. In particular, FIG. 6 shows output waveforms of two sensors located 90 electrical degrees apart, where the waveform 630 corresponds to a first sensor, and the waveform 632 corresponds to a second sensor. Position information can be decoded or extracted from the substantially sinusoidal waveforms 630, 632 shown in FIG. 6 by applying principles well known in the art, similar to the "sine-cosine" method used within some conventional resolvers. As in the triangular waveform method described above with respect to FIGS. 4 & 6, portions of each waveform nearest the zero-flux crossings of the waveform can be the primary signals used to decode the rotor position.

In another embodiment of the invention, a single analog switch, i.e., Hall effect sensor, is used with one sense ring. Linear portions of the sensor output can be used as described above to determine rotor position. Nonlinear portions of the sensor output near the waveform peaks can either be ignored, or can be used to estimate rotor position. Rotor speed and acceleration information can also be used to estimate the rotor position during a time period in which the sensor output is nonlinear.

In another embodiment of the invention, two sense rings and at least two and preferably three Hall effect sensors are used. One ring is used to sense high resolution increments, and the other ring is used to sense absolute position. Where three sensors are available, two of the sensors can be used with the high resolution sense ring to provide an indication of absolute rotor position within an electrical cycle, and a third sensor can be used with the absolute position sense ring to provide information that can be used to indicate within which electrical cycle of the mechanical revolution the rotor is located. The high resolution sense ring preferably has a number of magnetic poles that equals a number of motor field poles, or equals an integer multiple of the number of motor field poles. The absolute position sense ring preferably has two poles (magnetic north and magnetic south). The poles can have the same size, for example each pole occupies half or 180° of the sense ring. Alternatively, one pole can occupy a large portion of the absolute position sense ring, and the other pole can occupy a remaining, smaller portion of the ring.

Figure 11:
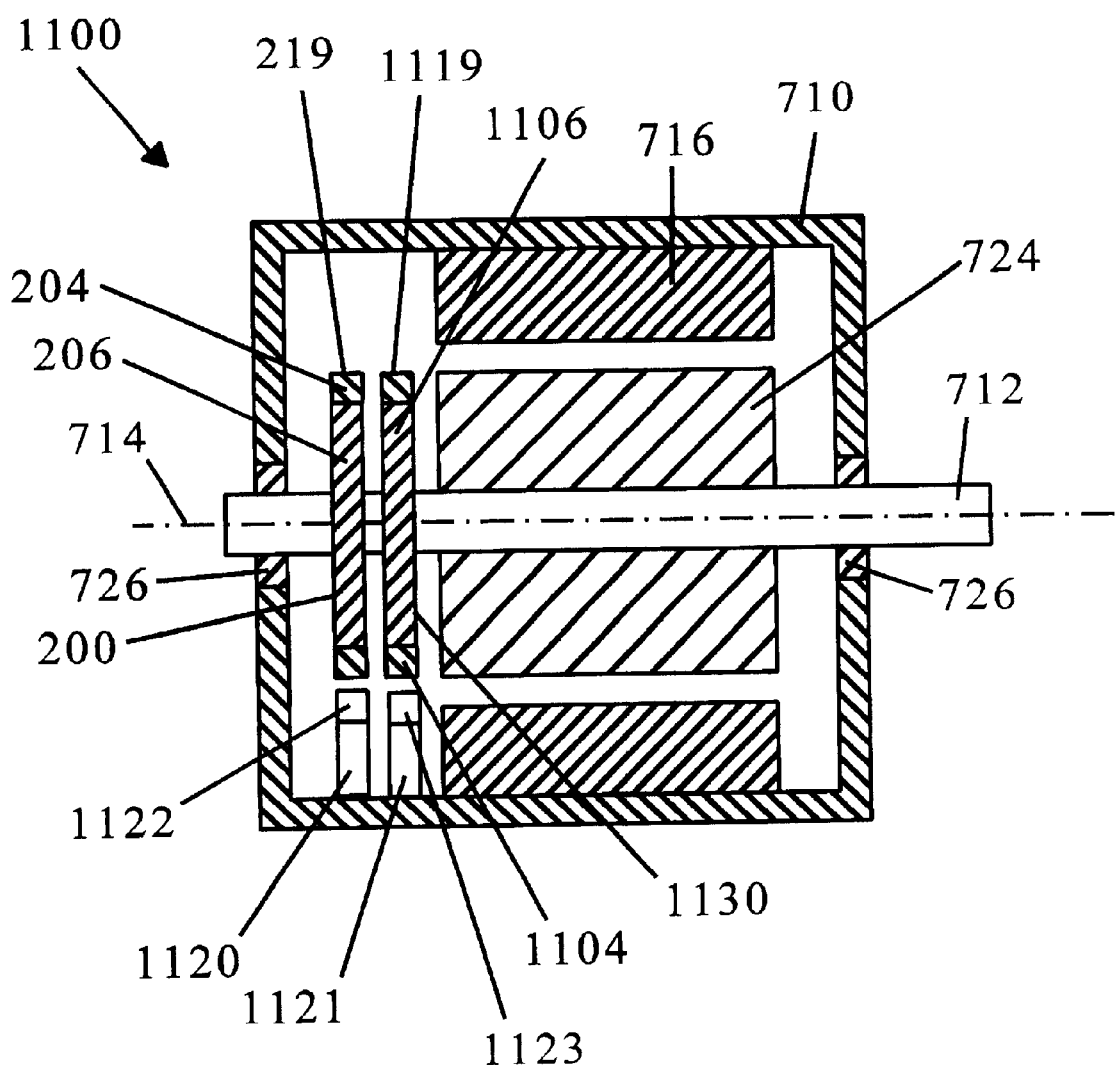
FIG. 11 is a side view of an electric motor with two sense elements in accordance with an embodiment of the invention.

For example, FIG. 11 shows a motor 1100 that is similar to those shown in FIGS. 7 and 8, but has two sense elements. The sense elements can be sense rings. For example, FIG. 11 shows a sense ring 200 and a sense ring 1130 that is similar to the sense ring 200, and includes magnets 1104, an inner ring or backing material 1106, and has a circumferential face 1119. A Hall Effect sensor 1122 is positioned near the sense ring 200 by a support 1120, so that the sensor 1122 measures magnetic flux from the sense ring 200 that is tangential to an outer circumference 219 of the sense ring 200, and a Hall Effect sensor 1123 is likewise positioned near the sense ring 1130 by a support 1121. The sensors 1122 and 1123 are fixed with respect to the stator 716. One of the sense elements can be used as an absolute position sense element, and the other sense element can be used as a high resolution sense element.

As a further alternative, at least one sensor can be used with the high resolution sense ring, and two sensors mounted 90° apart can be used with an absolute position sense ring having two poles so that an absolute mechanical position of the rotor can be determined at any point in time.

As yet a further alternative, a different method that does not employ a Hall effect sensor oriented to measure magnetic flux tangential to the surface of the sense ring or disc, can be used to supply an absolute position signal once per mechanical revolution of the rotor.

In another embodiment, an analog signal from a Hall effect sensor is used directly to sense rotor position instead of a digital signal that is based on the analog signal and obtained by supplying the analog signal to an A/D converter.

According to an embodiment of the invention, the Hall effect sensor(s) can be fixed with respect to the motor rotor, and the sensing element can be fixed with respect to the motor stator.

According to an embodiment of the invention, the number of magnetic poles of the sense element is different than the number of motor field poles. For example, A greater number of magnetic poles of the sense element than motor field poles can be provided. Generally, where the sense element poles are used to determine an incremental position of the motor rotor with respect to the motor stator, increasing the number of sense element poles increases the accuracy and resolution of the determined incremental position.

The sense ring or disc can, for example, be made out of ferrite, bonded NdFeB, sintered NdFeB, or SmCo. Other sensors besides Hall effect sensors that also generate a substantially triangular or sinusoidal output waveform that is a graph of position vs. sensor output, can be used instead of, or in addition to, Hall effect sensors.

Figure 9:
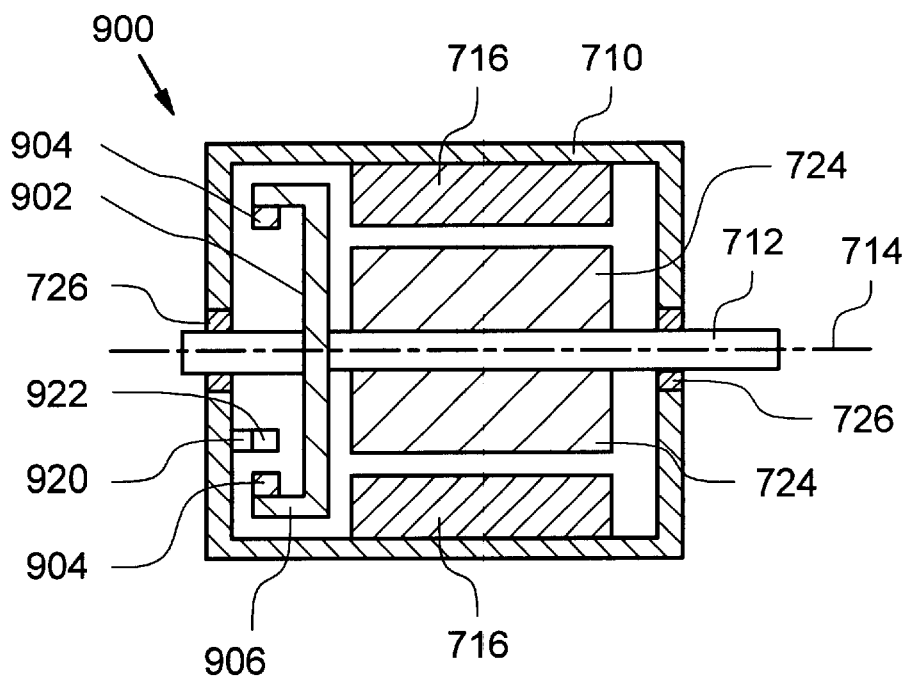
FIG. 9 is a side view of a electric motor with a sense ring in accordance with an embodiment of the invention.

FIG. 9 shows another embodiment wherein a motor 900 is similar to the motor 700 shown in FIG. 7, but differs in that the sense ring 902 is formed in a cup shape, so that the magnets 904 are disposed on an inner diameter of a rim of the cup 906, which is formed of soft magnetic or non-magnetic material. A support 920 holds a Hall effect sensor 922 near an inner diameter of the ring formed by the magnets 904 along the rim of the cup 906.

Although the invention has been described in detail with reference only to presently preferred embodiments, those skilled in the art will appreciate that various modifications can be made without departing from the invention. Accordingly, the invention is defined only by the following claims which are intended to embrace all equivalents thereto.

What is claimed is:

1. A method for controlling a brushless electric motor having a rotor, at least one sense element with a plurality of magnetic poles, and at least first and second Hall effect sensors mounted 90 electrical degrees apart to measure magnetic flux from the magnetic poles in a direction tangential to the sense element, wherein one of a) the sense element and b) the first and second sensors is mounted in a fixed relationship with the rotor, comprising the steps of:

measuring magnetic flux tangential to the at least one sense element using the at least first and second sensors and outputting a corresponding measurement signal for each at least one first and second sensor;

using the measurement signals to decode a rotational position of the rotor; and controlling the motor based on the decoded rotor position.

2. The method of claim 1, wherein the measurement signal has a substantially triangular waveform shape.

3. The method of 1, wherein the measurement signal has a substantially sinusoidal waveform shape.

4. The method of claim 1, wherein a number of the plurality of magnetic poles equals a number of motor field poles.

5. The method of claim 1, wherein each of the plurality of magnetic poles is a permanent magnet pole.

6. The method of claim 1, wherein during the measuring step there is relative movement between a) the sense element and b) the first and second sensors.

7. The method of claim 1, wherein the only one of the sense element and the first and second sensors that is in fixed relationship with the rotor moves relative to the other of the sense element and the first and second sensors during the measuring step.

8. A method for controlling a brushless electric motor having a rotor, at least one sense element with a plurality of magnetic poles, and at least first and second sensors mounted to measure magnetic flux from the magnetic poles in a direction tangential to the sense element, wherein one of a) the sense element and b) the first and second sensors is mounted in a fixed relationship with the rotor, comprising the steps of:

measuring magnetic flux tangential to the at least one sense element using the at least first and second sensors and outputting a corresponding measurement signal for each at least one first and second sensor;

for each signal, selecting threshold values that equal values of the signal that occur at plus and minus 45 electrical degrees from a zero crossing of the signal;

discarding portions of the signals whose absolute values are greater than the absolute values of the threshold values, wherein the remaining portions of the signals are linear segments, and wherein each position of the sense element with respect to the at least first and second sensors corresponds to a point on one of the linear segments;

determining the rotational position of the rotor based on the remaining portions of the signals; and controlling the motor based on the determined rotor position.

9. A method for controlling a brushless electric motor having a rotor, at least one sense element with a plurality of magnetic poles, and at least first and second sensors mounted to measure magnetic flux from the magnetic poles in a direction tangential to the sense element, wherein one of a) the sense element and b) the first and second sensors is mounted in a fixed relationship with the rotor, comprising the steps of:

measuring magnetic flux tangential to the at least one sense element using the at least first and second sensors and outputting a corresponding measurement signal for each at least one first and second sensor;

for each signal, selecting threshold values that equal values of the signal that occur at plus and minus 45 electrical degrees from a zero crossing of the signal;

determining the rotational position of the rotor based on signal values between the threshold values; and controlling the motor based on the determined rotor position.

10. The method of claim 9, wherein each rotational position of the rotor corresponds to a value of one of the signals, and the value is between the threshold values for the signal.

11. A method for controlling a brushless electric motor having a rotor, at least one sense element with a plurality of magnetic poles, and at least first and second sensors each having a sensing plane oriented perpendicular to a surface of the sense element to measure magnetic flux from the magnetic poles in a direction tangential to the sense element, wherein one of a) the sense element and b) the first and second sensors is mounted in a fixed relationship with the rotor, and wherein the at least first and second sensors are mounted 90 electrical degrees apart, comprising the steps of:

measuring magnetic flux tangential to the at least one sense element using the at least first and second sensors and outputting a corresponding measurement signal for each at least one first and second sensor;

using the measurement signals to decode a rotational position of the rotor; and controlling the motor based on the decoded rotor position.

12. The method of claim 11, wherein the at least first and second sensors are Hall effect sensors.

* * * * *